United States Patent
Nelson et al.

[15] 3,647,421
[45] Mar. 7, 1972

[54] REPROCESSING A PLUTONIUM DIOXIDE-MOLYBDENUM FUEL

[72] Inventors: Paul A. Nelson, Wheaton, Ill.; Donald A. Wenz, Livermore, Calif.

[73] Assignee: The United States of America as represented by the United States Atomic Energy Commission

[22] Filed: Apr. 4, 1969

[21] Appl. No.: 813,733

[52] U.S. Cl. .............................................75/84.1 A, 23/325
[51] Int. Cl. .......................................................C22b 61/04
[58] Field of Search ........................75/84.1 A, 84.1 R, 84.5; 23/324, 325

[56] References Cited

UNITED STATES PATENTS

| | | | |
|---|---|---|---|
| 3,326,673 | 6/1967 | Knighton et al. | 23/325 |
| 3,284,190 | 11/1966 | Knighton et al. | 75/84.1 |
| 3,160,470 | 12/1964 | Lambert | 23/325 |
| 3,102,849 | 9/1963 | Vander Wall et al. | 23/324 |
| 3,063,830 | 11/1962 | Martin et al. | 75/84.1 |
| 2,968,547 | 1/1961 | Lyon et al. | 75/84.1 |

Primary Examiner—Carl D. Quarforth
Assistant Examiner—B. H. Hunt
Attorney—Roland A. Anderson

[57] ABSTRACT

Plutonium is recovered from an oxidation-resistant plutonium dioxide-molybdenum fuel by reacting the fuel with molten cupric chloride contained in a molten salt to form a soluble plutonium species, an insoluble molybdenum species and a volatile molybdenum species. Plutonium is reduced and separated from the cupric chloride by mixing the salt with a zinc-magnesium or a cadmium-magnesium alloy which is thereafter retorted to leave essentially pure plutonium metal.

7 Claims, No Drawings

REPROCESSING A PLUTONIUM DIOXIDE-MOLYBDENUM FUEL

CONTRACTUAL ORIGIN OF THE INVENTION

The invention described herein was made in the course of, or under, a contract with the United States Atomic Energy Commission.

BACKGROUND OF THE INVENTION

This invention relates to the separation and purification of plutonium and more particularly it relates to the recovery of plutonium from a fuel consisting of plutonium dioxide dispersed in a molybdenum matrix.

Isotopic power sources are being developed for a variety of uses, for instance to provide operating power for satellites or for inaccessible weather stations or for navigational beacons at sea. One physical and chemical requirement of the fuel for these isotopic power sources is that it be oxidation resistant at high temperatures. To that end, an isotopic fuel has been developed which consists of a dispersion of about 85 percent plutonium dioxide in a molybdenum matrix, which is oxidation resistant at temperatures of about 1,200° C. While $^{238}$Pu is the contemplated isotope in this system, other plutonium isotopes will have the same chemical behavior and are included in the scope of this invention. One disadvantage of the fuel being oxidation resistant at high temperatures is the difficulty of reprocessing it to recover any unused $^{238}$Pu.

The principal object of this invention is to provide a process by which a highly oxidation-resistant plutonium dioxide-molybdenum fuel may be reprocessed to produce an essentially pure plutonium product.

SUMMARY OF THE INVENTION

This invention comprises contacting a dispersion of plutonium dioxide in a molybdenum matrix with molten cupric chloride to produce a soluble plutonium species, an insoluble molybdenum species and a volatile molybdenum species and thereafter separating the soluble plutonium species from the salt by contacting the salt with an alloy which preferentially reduces the plutonium from the salt.

DETAILED DESCRIPTION OF THE PREFERRED EMBODIMENT

The following are representative experiments to better illustrate the process of this invention.

EXPERIMENT I 5.6 grams of molybdenum sheet metal, 20 grams of anhydrous cupric chloride and 150 grams of a magnesium chloride-sodium chloride-potassium chloride diluent salt were placed in an alumina crucible inside a furnace, heated from 550°–600° C. and stirred for about 2 hours with a fused silica stirrer. After cooling, both the frozen salt mixture and the furnace were inspected and a brown powder was found sublimed on the cold surfaces of the furnace. Upon X-ray diffraction, the powder was determined to be molybdenum tetrachloride. Molybdenum tetrachloride is volatile at these temperatures and boiled off the salt melt in the crucible and condensed on cooler surfaces. The frozen salt was broken into pieces and any unreacted molybdenum was recovered and weighed. About 2.2 grams of molybdenum had reacted.

EXPERIMENT II

Fifty grams of cupric chloride, 140 grams of the diluent salt used in the first experiment and 4.8 grams of molybdenum were placed in an alumina crucible inside a furnace, heated to about 600° C. and stirred for an hour and a half. After the salt was cooled and pulverized, it was found that 99 percent of the molybdenum had reacted. Experiments I and II show that if sufficient cupric chloride is present the molybdenum will react therewith.

EXPERIMENT III

A cermet consisting of 85 weight percent plutonium dioxide dispersed in a molybdenum matrix was introduced into an alumina crucible which was housed in a larger tantalum crucible. Into the alumina crucible, along with a 14.4 gram piece of the cermet, were placed 125 grams of the diluent salt used above and 40 grams of cupric chloride. The crucible was placed in a furnace, heated to 590° C. and the mixture was stirred at that temperature for 6 hours. Samples were removed every 2 hours using fused silica tubes with sintered quartz filters. When the furnace was opened, there was a large amount of yellow-white sublimate on the cool surfaces of the furnace. The sublimate was determined by X-ray diffraction to be tantalum pentachloride which was probably produced by the presence of chlorine gas evolved from unused cupric chloride or from the decomposition of a molybdenum oxychloride. Upon pulverization of the salt no trace of the cermet was found although there was a very thin layer of black material at the bottom of the salt. The insoluble black material was determined to be molybdenum dioxide while examination of the salt showed it contained less that $3 \times 10^{-4}$ percent molybdenum metal. The following reactions are believed to be the basis for the dissolution of the cermet:

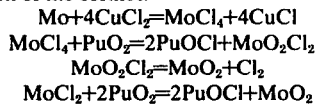

As may be seen molybdenum partitions between an insoluble $MoO_2$ species and a volatile $MoCl_4$ species and as shown in the above experiment very little remains in the salt. Plutonium, on the other hand, forms only a soluble oxychloride species and remains in the salt.

EXPERIMENT IV

The salt from Experiment III was contacted with molten zinc metal maintained at 600° C. to reduce any cuprous chloride or cupric chloride remaining in the salt to metallic copper which transferred to the zinc phase. The plutonium oxychloride is not substantially affected by contact with the zinc. It should be noted that any impurities present in the salt which form less stable chlorides than zinc chloride would separate into the zinc phase and any elements more noble than zinc would also separate into the zinc phase; for example, iron, nickel and chromium. The salt was separated from the zinc phase and mixed with a zinc-25 weight percent magnesium alloy. The plutonium oxychloride present in the salt was reduced to metallic plutonium which dissolved in the zinc-magnesium alloy. This preferential reduction was carried out at 600° C. with agitation of the salt and alloy, and while the plutonium values were reduced and transferred to the alloy other constituents of the salt were unaffected. The zinc-magnesium alloy containing the plutonium was retorted under vacuum at a temperature between 800°–900° C. to volatilize zinc and magnesium; the product from this step was essentially pure plutonium metal.

While the combination of experiments III and IV is an example of one separation and purification process, it uses specific materials which are convenient but not absolutely necessary for the success of the process. For instance, the diluent salt, at least insofar as the dissolution of the plutonium dioxide-molybdenum fuel is concerned, is an inert ingredient and need not be the specific composition named. The necessity of the partial reduction performed with zinc metal depends upon the presence of the kinds of impurities in the salt which will readily transfer to the zinc phase and the degree of product purity required. The preferential reduction performed with the zinc-25 weight percent-magnesium alloy could also be performed with any zinc-magnesium alloy with a magnesium content from about 10 to 30 weight percent as well as with a cadmium-magnesium alloy in which the magnesium is present from about 10 to 30 weight percent. Naturally, the precise retorting temperature will depend upon the boiling temperatures of the various alloy constituents but, in general, it is performed between 700°-900° C. and preferably under a vacuum, for instance, 0.1 mm. Hg.

The embodiments of the invention in which an exclusive property or privilege is claimed are defined as follows:

1. A process for recovering plutonium values from a fuel containing plutonium dioxide dispersed in a molybdenum matrix comprising introducing the fuel into a molten salt consisting essentially of a mixture of magnesium chloride, sodium chloride, potassium chloride and an effective amount of cupric chloride to produce a plutonium oxychloride, a volatile molybdenum tetrachloride and a molybdenum dioxide insoluble in the molten salt and separating the plutonium containing salt from the volatile and the insoluble molybdenum compounds.

2. The process of claim 1 wherein the molten salt is maintained between about 550° C. and about 600° C. and the salt is agitated during dissolution of the fuel.

3. The process of claim 1 wherein the fuel contains greater than 50 weight percent plutonium dioxide.

4. A process of claim 1 wherein the fuel consists of 85 weight percent plutonium dioxide dispersed in a molybdenum matrix.

5. The process of claim 1 wherein the plutonium containing molten salt is first mixed with molten zinc whereby any copper and molybdenum present transfer to the molten zinc while the plutonium values remain in the salt, separating the plutonium containing molten salt from the molten zinc, contacting the plutonium containing molten salt with a reducing alloy, said alloy being selected from the group consisting of zinc-10 to 30 weight percent magnesium and cadmium-10 to 30 weight percent magnesium, which preferentially reduces plutonium values present in the salt to metallic plutonium but does not reduce other constituents of the salt, said metallic plutonium values coextensive with their formation transferring to the reducing alloy, separating the molten salt from the plutonium containing reducing alloy and thereafter heating the plutonium and reducing alloy to separate the said alloy from the plutonium metal.

6. The process of claim 5 wherein the molten salt is maintained between about 550° C. and about 600° C. and agitated during dissolution of the fuel.

7. The process of claim 6 wherein the fuel consists of 85 weight percent plutonium dioxide dispersed in a molybdenum matrix, the cupric chloride is diluted with a mixture of magnesium chloride, sodium chloride and potassium chloride, the reducing alloy is an alloy selected from the group consisting of zinc-10 to 30 weight percent magnesium and cadmium-10 to 30 weight percent magnesium and is separated from the plutonium by heating the mixture of them to between about 700° and 900° C. under vacuum whereby the reducing alloy volatilizes while the plutonium remains behind.

* * * * *